United States Patent [19]

Adams

[11] 3,850,655

[45] Nov. 26, 1974

[54] DRYING AND SUBSEQUENT REDISPERSION OF MATERIALS

[75] Inventor: Roger William Adams, Cornwall, England

[73] Assignee: English Clays Lovering Pochin & Company, Limited, Cornwall, England

[22] Filed: Jan. 19, 1973

[21] Appl. No.: 325,031

[30] Foreign Application Priority Data

Jan. 21, 1972  Great Britain...................... 3111/72

[52] U.S. Cl............. 106/309, 106/308 B, 106/306, 106/288 B, 106/292, 106/297, 106/304, 106/72
[51] Int. Cl............................ C09c 1/02, C09c 1/28
[58] Field of Search............ 106/309, 308 B, 308 Q, 106/288 B, 72, 292, 306, 304

[56] References Cited
UNITED STATES PATENTS

| | | | |
|---|---|---|---|
| 3,126,290 | 3/1964 | Hemwall | 106/72 |
| 3,399,068 | 8/1968 | Horton | 106/72 |
| 3,661,610 | 5/1972 | Ferris | 106/309 |
| 3,674,529 | 7/1972 | Toms | 106/306 |

*Primary Examiner*—Delbert E. Gantz
*Assistant Examiner*—J. V. Howard
*Attorney, Agent, or Firm*—Armstrong, Nikaido & Wegner

[57]  ABSTRACT

A method of preparing and drying finely divided particles comprising a slightly water-soluble material so as to facilitate subsequent redispersion thereof is provided. The method comprises forming an aqueous suspension which contains the finely divided particles of the slightly water-soluble solid material and at least 7.5 percent by weight of a finely divided aluminosilicate material of specified particle size. The mixture thus obtained is then subjected to a drying process.

12 Claims, No Drawings

DRYING AND SUBSEQUENT REDISPERSION OF MATERIALS

BACKGROUND OF THE INVENTION

This invention relates to the drying and the subsequent redispersion of finely divided materials and, more particularly but not exclusively, is concerned with the drying and the redispersion of finely divided, slightly water-soluble materials or of a mixture of finely divided materials at least one of which is slightly soluble in water.

A wide variety of processes for drying materials are available today. One such process is known as spray drying and this process generally provides a convenient method for drying solid particles, which are in an aqueous suspension, in such a way that the dried particulate material is easily redispersible in water. However, with practically all drying processes when the solid material is, or comprises a component which is, slightly soluble in water (i.e., has a solubility in the range of from 0.0001 to 0.5 grams per 100 ml of water at 100°C) and is present in the original suspension in a finely divided state it has been found that the dried product contains a high proportion of aggregates larger than about 50 microns diameter even if the product has been spray dried. These aggregates are not broken down, or are only broken down with great difficulty, on redispersion of the dried solid in water.

SUMMARY OF THE INVENTION

According to the present invention, there is provided a method of preparing and drying finely divided particles comprising a slightly water-soluble solid material so as to facilitate subsequent redispersion thereof, which method comprises forming an aqueous suspension which contains said finely divided particles of the slightly water-soluble solid material and at least 7.5 percent by weight, based on the weight of the finely divided particles of slightly water-soluble solid material, of a finely divided aluminosilicate material, of which at least 60 percent by weight consists of particles smaller than 2 microns equivalent spherical diameter, and subjecting the mixture thus obtained to a drying process.

DESCRIPTION OF THE PREFERRED EMBODIMENTS

The method of the invention is especially useful in the preparation and drying of finely divided material containing at least 50 percent by weight of particles smaller than 2 microns equivalent spherical diameter.

Although there is theoretically no upper limit for the amount of aluminosilicate material used, the amount will not generally be greater than 150 percent by weight based on the weight of the slightly water-soluble material. The particle size distribution of the finely divided aluminosilicate material can be gaussian or approximately gaussian; fine particles are necessary since it is believed that aggregate formation is prevented by the presence of fine particles of the aluminosilicate material.

It has been found that clays, and particularly kaolinitic clays, are especially useful in carrying out the method of the invention. Kaolinitic clays include ball clays, china clays and other clays which contain kaolinite. Other aluminosilicate materials can be used, for example there can be used heat-treated clays, e.g. the calcined kaolin sold under the Trade Mark MOLOCHITE.

Advantageously, the aqueous suspension comprises at least 10 percent, but not more than 25 percent, by weight, based on the weight of the slightly water-soluble solid material, of the finely divided aluminosilicate material.

The formation of the aqueous suspension may be assisted, if necessary or desirable, by the addition thereto of a minor quantity of a dispersing agent, e.g., a compound containing organic polymeric onions. The quantity of dispersing agent, when used, will generally be from 0.1 to 1.0 percent by weight based on the total weight of solids in the aqueous suspension. Salts of polyacrylic acid may be employed as the dispersing agent if such is used.

The mixture obtained by the method of the invention can be subjected to any conventional drying process, e.g., in a drum drier, a rotary drier or a turbotray drier, but it is preferred to subject the mixture to a spray drying process.

Solid materials which are slightly water-soluble and which can be treated by the method of the present invention include synthetic chemicals, such as organic pigments and pharmaceutical products, agricultural chemicals, fertilisers and non-argillaceous minerals such as the carbonates of magnesium, calcium, strontium, barium, manganese, ferrous iron, zinc and lead; the sulphates of calcium, strontium, barium and lead; and the fluorides of nagnesium, calcium, strontium and barium. If a slightly water-soluble carbonate is to be treated by the method of the invention, the storage life of the dried material is increased if there is added to the mixture before drying from 0.01 to 0.5 percent by weight, based on the total weight of dry, slightly water-soluble solid material, of a water-soluble carbonate, for example sodium, potassium or ammonium carbonate.

When the slightly soluble solid material is to be used, for example, as a filler for rubber or for plastics materials, as an extender for a paint or as a paper coating pigment, the presence of a minor quantity of an aluminosilicate material, e.g., a kaolin, is not detrimental and may be advantageous in improving the optical and/or rheological properties of the solid material. Similarly, the presnece of a minor quantity of an aluminosilicate material in a fertiliser, pharmaceutical product, organic pigment or other synthetic chemical may not be detrimental and may in some cases convey further advantages.

The invention will be illustrated by the following Examples:

EXAMPLE 1

Mixtures of ground Italian calcite marble and finely divided English kaolin were prepared in various proportions of the two components. The Italian calcite marble had previously been ground by means of a particulate grinding medium to a particle size distribution such that 90 percent by weight consisted of particles smaller than 2 microns equivalent spherical diameter. 80 percent by weight of the English kaolin consisted of particles smaller than 2 microns equivalent spherical diameter. Ten lbs. of each mixture were made into a slurry with ten lbs. of water which contained 0.45 percent by weight, based on the weight of dry minerals, of a sodium polyacrylate dispersing agent which had a number average molecular weight of 1650. The slurry thus formed was dried in a small laboratory spray drier, manufactured by George Scott Ltd., which had a throughput of approximately 0.5 – 1.0 kg per hour. The dry product was tested for dispersibility by mixing it with water in a turbine mixer which contained a three-bladed turbine impeller of 38 mm diameter for 5 minutes so as to give a suspension containing 30% by weight of solids, after which the suspension was poured through a No. 300 mesh British Standard sieve (nominal aperture 53 microns). The results which were obtained are shown in Table 1 below:

TABLE 1

| Run No. | Wt.% calcite marble | Wt.% kaolin | Degree of dispersion |
| --- | --- | --- | --- |
| 1 | 100 | 0 | None |
| 2 | 99 | 1 | do. |
| 3 | 95 | 5 | Very slight |
| 4 | 92.5 | 7.5 | Partial |
| 5 | 90 | 10 | Complete |
| 6 | 75 | 25 | do. |
| 7 | 50 | 50 | do. |
| 8 | 0 | 100 | do. |

A visual estimate of the amount of solids retained on the sieve indicated that about 50 percent was retained on runs Nos. 1 and 2, about 40 percent was retained on Run No. 3, and about 10 percent was retained on run No. 4. There was no retention of solids on runs Nos. 5, 6, 7 and 8.

EXAMPLE 2

The same ground Italian calcite marble as was used in Example 1 and an English kaolin having a particle size distribution such that 75 percent by weight consisted of particles having an equivalent spherical diameter smaller than 2 microns and 0.5 percent by weight of particles having an equivalent spherical diameter larger than 10 microns were mixed with water in the proportions 90 parts by weight of marble, 10 parts by weight of kaolin and 43 parts by weight of water. There was dissolved in the water 0.45 percent by weight, based on the total weight of dry minerals, of the same sodium polyacrylate dispersing agent as was used in Example 1. The mixture was dried in a spray drier manufactured by Niro Atomizer Limited which had a throughput rate of about 100–150 Kg. per hour, and the dried material was stored in the air for a period of about sixteen weeks. At intervals throughout this period samples of the dried material were taken and subjected to the following dispersion test. 422 ml of water were measured into a cylindrical brass mixing vessel of diameter 95 mm. and height 150 mm. which was provided with a six-bladed turbine impeller of diameter 50 mm. The impeller speed was raised to 1,500 r.p.m., a stop watch started and 988 g. of the dried material added as quickly as possible. After 2 minutes (as indicated by the stop watch) a sample of the material within the vessel, which was in the form of a slurry, was withdrawn and the percentage by weight of the solids which consisted of particles having an equivalent spherical diameter greater than 10 microns and the percentage by weight of particles having an equivalent spherical diameter smaller than 2 microns were determined by sedimentation methods. The results are shown in Table 2 below:

TABLE 2

| Weeks stored | % by weight of particles | |
| --- | --- | --- |
| | greater than 10 microns | smaller than 2 microns |
| 0 | 0.5 | 88.4 |
| 1 | 1.3 | 86.6 |
| 2 | 1.2 | 84.6 |
| 3 | 0.6 | 87.0 |
| 4 | 1.6 | 85.2 |
| 6 | 3.3 | 83.9 |
| 8 | 3.0 | 80.0 |
| 10 | 8.5 | 78.4 |
| 16 | 23.3 | 58.6 |

These results show that, although up to 4 weeks there is no significant formation of aggregates, after 6 weeks some aggregation has taken place, and this increases with prolonged storage.

EXAMPLE 3

The experiment described in Example 2 was repeated except that there was added to the initial mixture 0.05 percent by weight of sodium carbonate, based on the weight of total solids. The redispersibility of the dried material after storing for different lengths of time was investigated as described in Example 2 and the results are shown in Table 3 below:

TABLE 3

| Weeks stored | % by weight of particles | |
| --- | --- | --- |
| | greater than 10 microns | smaller than 2 microns |
| 0 | 1.3 | 85.4 |
| 1 | 1.5 | 86.8 |
| 2 | 2.3 | 86.1 |
| 3 | 1.2 | 86.3 |
| 4 | 1.6 | 86.7 |
| 7½ | 1.1 | 85.8 |
| 10 | 1.5 | 84.2 |
| 15 | 2.6 | 82.1 |

These results show that if a small amount of sodium carbonate is added to the mixture, the storage life before aggregation occurs is increased from 4 weeks (Example 2) to about 15 weeks.

An attempt was made to repeat the experiment using 1.0 percent by weight of sodium carbonate, based on the weight of total solids, instead of 0.05 percent by weight, but a stiff gel was formed which could not be worked.

EXAMPLE 4

The experiment described in Example 2 was repeated except that the initial mixture consisted of 87.5 parts by weight of the ground Italian calcite marble, 12.5 parts by weight of the kaolin and 43 parts by weight of water. The redispersibility of the dried material after storing for different lengths of time was investigated as described in Example 2 and the results are shown in Table 4 below:

TABLE 4

| Days stored | % by weight of particles | |
| --- | --- | --- |
| | greater than 10 microns | smaller than 2 microns |
| 0 | 0.0 | 88.0 |
| 9 | 1.2 | 85.9 |
| 14 | 0.7 | 85.6 |

TABLE 4-Continued

| Days stored | % by weight of particles | |
|---|---|---|
| | greater than 10 microns | smaller than 2 microns |
| 21 | 1.5 | 84.1 |
| 29 | 0.4 | 86.3 |
| 44 | 0.5 | 85.7 |

These results show that there is no significant formation of aggregates even after 44 days.

EXAMPLE 5

The experiment described in Example 2 was repeated except that the initial mixture consisted of 85 parts by weight of the ground Italian calcite marble, 15 parts by weight of the kaolin and 43 parts by weight of water. The redispersibility of the dried material after storing for different lengths of time was investigated as described in Example 2 and the results are shown in Table 5 below:

TABLE 5

| Days stored | % by weight of particles | |
|---|---|---|
| | greater than 10 microns | smaller than 2 microns |
| 0 | 1.5 | 86.7 |
| 9 | 0.6 | 87.4 |
| 19 | 0.0 | 85.5 |
| 26 | 0.2 | 86.5 |
| 33 | 0.3 | 86.8 |

EXAMPLE 6

The experiment described in Example 2 was repeated except that the initial mixture consisted of 80 parts by weight of the ground Italian calcite marble, 20 parts by weight of the kaolin and 43 parts by weight of water. The redispersibility of the dried material after storing for different lengths of time was investigated as described in Example 2 and the results are shown in Table 6 below:

TABLE 6

| Days stored | % by weight of particles | |
|---|---|---|
| | greater than 10 microns | smaller than 2 microns |
| 0 | 0.0 | 87.2 |
| 7 | 0.7 | 85.8 |
| 14 | 0.8 | 85.5 |
| 22 | 0.6 | 86.4 |
| 28 | 0.02 | 86.8 |

EXAMPLE 7 (Comparison)

The experiment described in Example 2 was repeated except that the initial mixture consisted of 100 parts by weight of the ground Italian calcite marble, 43 parts by weight of water and no kaolin. The redispersibility of the dried material after storing for different lengths of time was investigated as described in Example 2 and the results are shown in Table 7 below:

TABLE 7

| Days stored | % by weight of particles | |
|---|---|---|
| | greater than 10 microns | smaller than 2 microns |
| 0 | 24.2 | 69.8 |
| 7 | 32.2 | 57.2 |
| 14 | 36.7 | 55.9 |
| 21 | 36.1 | 51.3 |
| 28 | 42.1 | 48.0 |

These results show that, in the absence of any kaolin, considerable aggregation, which increases on storage, occurs.

EXAMPLE 8

A sample of strontium carbonate from Gloucestershire which had been ground until the particle size distribution was such that about 90 percent by weight consisted of particles smaller than 2 microns equivalent spherical diameter and 2.0 percent by weight of particles larger than 10 microns equivalent spherical diameter, the same kaolin as was used in Example 2, and water were mixed in the proportions 90 parts by weight of strontium carbonate, 10 parts by weight of kaolin and 43 parts by weight of water. There was dissolved in the water 0.45 percent by weight, based on the total weight of dry minerals, of the same sodium polyacrylate dispersing agent as was used in Example 1. The mixture was spray dried in the manner described in Example 2 and the dried material was subjected to the same dispersion test except that the mixing time was extended to 60 minutes and samples were withdrawn at intervals during that period and the percentage by weight of the solids which consisted of particles having an equivalent spherical diameter greater than 10 microns was determined for each sample.

The experiment was repeated using a mixture consisting of 100 parts by weight of the same strontium carbonate and 43 parts by weight of water, there being dissolved in the water 0.45 percent by weight, based on the weight of dry strontium carbonate, of the sodium polyacrylate dispersing agent. The results are shown in Table 8 below:

TABLE 8

| 10 microns Mixing time (minutes) | % by weight larger than | |
|---|---|---|
| | 90% strontium carbonate 10% kaolin | 100% strontium carbonate |
| 2 | 23.6 | 36.7 |
| 5 | 15.5 | 28.6 |
| 10 | 11.5 | 22.7 |
| 20 | 9.0 | 17.4 |
| 35 | 5.7 | 11.6 |
| 60 | 4.7 | 10.0 |

These results show that in neither case was the percentage by weight of particles larger than 10 microns as low as the undried value of 2.0 percent by weight. In other words neither material was completely dispersed. The mixture containing 10 percent by weight of clay, however, did show consistently lower values for the percentage by weight larger than 10 microns than the strontium carbonate alone.

I claim:

1. A method of preparing and drying fine particles comprising a slightly water-soluble carbonate so as to facilitate subsequent redispersion thereof, which method comprises forming an aqueous suspension which contains fine particles of the slightly water-soluble carbonate, from 0.01 percent to 0.5 percent by weight based on the weight of the slightly water-soluble carbonate of a water-soluble carbonate and at least 7.5 percent by weight, based on the weight of slightly water-soluble carbonate, of a fine particulate aluminosilicate material, of which at least 60 percent by weight consists of particles smaller than 2 microns equivalent spherical diameter, and subjecting the mixture thus obtained to a drying process.

2. A method according to claim 1, wherein said aluminosilicate material is a kaolinitic clay.

3. A method according to claim 1, wherein said aluminosilicate is a heat-treated clay.

4. A method according to claim 1, wherein said aqueous suspension contains from 10 percent to 25 percent by weight, based on the weight of the finely divided particles of slightly water-soluble material, of said aluminosilicate material.

5. A method according to claim 1, wherein said drying process is a spray-drying process.

6. A method according to claim 1, wherein said drying process is a drum-drying, rotary-drying or a turbo-tray drying process.

7. A method of preparing and drying fine particles comprising a carbonate whose solubility in water at 100°C is in the range of from 0.0001 to 0.5 grams per 100 ml. of water so as to facilitate subsequent redispersion thereof, which method comprises forming an aqueous suspension which contains fine particles of the slightly water-soluble carbonate, from 0.01 percent to 0.5 percent by weight based on the weight of slightly water-soluble carbonate of a water-soluble carbonate, and from 10% to 25% by weight, based on the weight of the slightly water-soluble carbonate, of an aluminosilicate selected from the group consisting of kaolinitic clays and heat-treated clays of which at least 60 percent by weight consists of particles smaller than 2 microns equivalent spherical diameter, and subjecting the mixture thus obtained to a spray-drying process.

8. A method according to claim 7, wherein said slightly water-soluble carbonate is a carbonate of magnesium, calcium, strontium, barium, manganese, ferrous iron, zinc or lead.

9. A method according to claim 1, wherein said slightly water-soluble carbonate is a carbonate selected from the group consisting of the carbonates of magnesium, calcium, strontium, barium, manganese, ferrous iron, zinc and lead.

10. A method according to claim 7, wherein said water-soluble carbonate is selected from the group consisting of sodium, potassium and ammonium carbonates.

11. A method according to claim 1, wherein at least 50 percent by weight of the particles of the slightly water-soluble carbonate are smaller than two microns equivalent spherical diameter.

12. A method according to claim 7, wherein at least 50 percent by weight of the particles of the slightly water-soluble carbonate are smaller than 2 microns equivalent spherical diameter.

* * * * *